United States Patent [19]

Clarke

[11] Patent Number: 4,915,479
[45] Date of Patent: Apr. 10, 1990

[54] LIQUID CRYSTAL DISPLAY ILLUMINATION SYSTEM

[75] Inventor: John A. Clarke, Carshalton, England

[73] Assignee: U.S. Philips Corporation, New York, N.Y.

[21] Appl. No.: 130,365

[22] Filed: Dec. 8, 1987

[30] Foreign Application Priority Data

Dec. 17, 1986 [GB] United Kingdom ............... 8630155

[51] Int. Cl.⁴ ..................... G02F 1/133; F21V 7/04
[52] U.S. Cl. .................................. 350/345; 362/32
[58] Field of Search ............. 350/345, 96.1, 96.18; 362/32

[56] References Cited

U.S. PATENT DOCUMENTS

| | | | |
|---|---|---|---|
| 3,825,741 | 7/1974 | Mortan et al. | 350/96.10 |
| 3,923,381 | 12/1975 | Winston | 350/628 |
| 4,114,592 | 9/1978 | Winston | 350/96.10 |
| 4,299,447 | 11/1981 | Soltan et al. | 350/345 |
| 4,330,813 | 5/1982 | Deutsch | 350/345 |
| 4,735,495 | 4/1988 | Henkes | 350/345 |

FOREIGN PATENT DOCUMENTS 0186179  7/1986  European Pat. Off. ........... 350/345
0155829  9/1984  Japan ................................. 350/345

OTHER PUBLICATIONS

Hecht et al, *Optics*, Addison–Wesley, Massachusetts, 1974, p. 81.

Primary Examiner—Andrew J. James
Assistant Examiner—Anita Pellman Gross
Attorney, Agent, or Firm—Paul R. Miller

[57] ABSTRACT

An illumination system is provided for a liquid crystal display panel. The panel 1 is placed to transmit light 2 from a light source 3 to a viewing location, the light source being an extended area source of omnidirectional light of high efficiency, such as a fluorescent tube. A light guide 6 is placed between the source and the panel, the light guide comprising a transparent input face 7 adjacent the source, a transparent output face 10 adjacent the panel, and reflective side walls 11 transverse to the input and output faces. The light guide is tapered, the input face being smaller in area than the output face. The divergence of light from the source is thereby reduced as it passes through the panel. The LCD panel then functions with an improved contrast range.

35 Claims, 3 Drawing Sheets

LIQUID CRYSTAL DISPLAY ILLUMINATION SYSTEM

Description

This invention relates to illumination systems for passive electro-optic display panels of the kind which can be used to display television pictures for example. The panels are passive in the sense that they do not generate light but modulate the brightness of incident illumination to provide modulated light for each of the picture elements in the picture displayed. More particularly the invention relates to an illumination system for a liquid crystal display panel wherein the panel is placed to transmit light from a light source to a viewing location.

Such illumination systems are described in European Patent Application Nos. 0,192,023A and 0,193,401A wherein projection television systems using liquid crystal panels are described. Both these systems use high intensity concentrated light sources and optical systems comprising mirrors and lenses to pass light through the panel. Projection lenses are then used to produce an enlarged image on a viewing screen. The light sources are therefore usually tungsten filament lamps of relatively low efficiency, requiring relatively high power and producing considerable heat which has to be dissipated as in European Patent Application No. 0,192,023A.

The present invention is more applicable to direct view television apparatus and, with portability and power economy in mind, is concerned with the use of high efficiency light sources. Such sources are usually phosphor layers of extended area emitting visible light when stimulated by electrons or by ultraviolet radiation generated in a gas discharge, such as in the well known fluorescent tube.

The light from such a phosphor layer is emitted into the full hemisphere, the layer appearing equally bright at all angles of view of the layer surface. Such light applied directly to a liquid crystal display panel would therefore pass through the panel in a wide range of angles. For many types of liquid crystal panel the desired function of modulating the intensity of the transmitted light for each picture element in accordance with a signal, is only obtained with a good range of contrast over a relatively small range of light angles, typically ±10 degrees, to the normal to the panel. At larger angles of incidence of the light, the contrast range is unacceptably degraded.

It is an object of the invention to enable high efficiency phosphor light sources to be used to iluminate a liquid crystal display panel by transmission and yet achieve an acceptable contrast range in the image displayed. The invention provides an illumination system for a liquid crystal display panel wherein the panel is placed to transmit light from a light source to a viewing location, characterised in that the light source is an extended area source of omnidirectional light, in that a light guide is placed between the source and the panel, the light guide comprising a transparent input face adjacent the source, a transparent output face adjacent the panel, and reflective side walls transverse to the input and output faces, and in that the light guide is tapered, the input face being smaller in area than the output face. Light enters the input face of the tapered guide over a wide range of angles but reflection from the side walls reduces the range of angles present in the light emerging from the output face. Increasing the ratio of the output face area to the input face area is effective in reducing the range of angles, away from the normal to the output face, which is present in the output light. However, reducing the range of angles also increases the ratio of the length of the light guide to the linear dimensions of the output face.

A material improvement in reduction of the relative length is obtained in such an illumination system characterised in that the output face comprises a positive lens. The effect of the lens is to refract light generally towards the guide axis, that is, to act as a collimating lens. For a given range of output angles the length of the guide can be materially reduced, leading to a more compact apparatus.

The guide may be hollow and may be internally reflective. Alternatively, the invention may be characterised in that the guide comprises a transparent material of a refractive index higher than that of the surrounding space whereby the side walls are reflective by total internal reflection. In this event the output face may be convex toward the panel thereby forming a positive lens.

The illumination system in accordance with the invention may be further characterised in that the side walls are curved in planes transverse to the input and output faces. The shape of the side walls can be chosen either to reduce the divergence of the output light or, in conjunction with the positive lens, to shorten the guide for a given divergence. Parts of a guide wall may be convex and other parts concave in some possible designs of guide. To obtain efficient reduction in divergence angles and reasonably sharp cut-off angles, special optical design techniques are employed. These special optical design principles of the tapered guide of the present invention are identical to those of the non-imaging concentrators of radiation designed, for example, for use as concentrators of solar radiation. The only difference between the guide and the concentrator being the reversed direction of the radiation. The design principles are covered in a book entitled "The optics of nonimaging concentrators" by W. T. Welford and R. Winston, Academic Press 1978 in chapters 4, 5 et seq., and will not be further referred to here except to give examples of guide shapes obtained for various values of the design parameters.

The invention may be further characterised in that a plurality of illumination systems are assembled so that the output faces of the light guides are adjacent to one another to cover the whole area of an extended liquid crystal display panel. If the output faces are identical to one another they may be arranged in regular rows and columns. Rectangular output and input faces may be used, though other shapes, such as triangular or hexagonal faces may be used.

For high efficiency conversion of electrical energy to light, the illumination system may be characterised in that the source comprises a phosphor layer energised to produce light. The phosphor layer may be energised by ultra-violet radiation from a gas discharge in a fluorescent tube, making use of a light source of high brightness and high reliability. For high efficiency in use of light from the phosphor layer in the case where a plurality of light guides are used, the illumination system may be characterised in that feeder light guides are provided one each for the tapered light guides, each feeder guide coupling an area of the source to the input face of the associated tapered guide.

To improve viewing conditions the illumination system may be characterised in that a light-diffusing screen is placed adjacent to the liquid crystal display panel on the side remote from the light guide. The light emerging from the liquid crystal display panel is then spread and is visible from a reasonably wide range of angles. A displayed television picture, for example, can then be seen by several people sitting side-by-side.

Embodiments of the invention will now be described with reference to the accompanying drawings in which.

Figure 1:
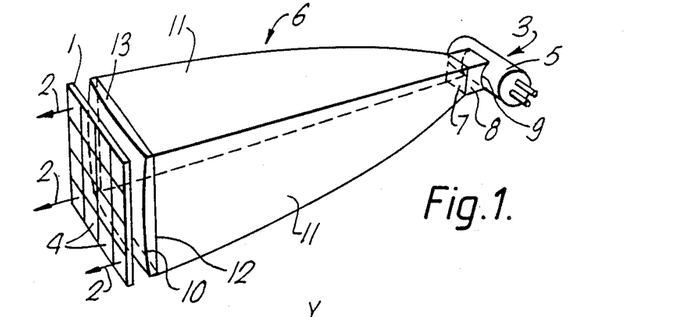
FIG. 1 shows an illumination system in accordance with the invention.

Referring to FIG. 1, an embodiment of an illumination system for a liquid crystal display panel is shown in accordance with the invention. A liquid crystal display panel 1 is placed to transmit light 2 from a light source 3 to a relatively distant viewing location, not shown, off to the left of FIG. 1. The panel is shown divided into sixteen separate pixels (picture elements) 4, largely for clarity in the drawing. The panel may in practice, at one extreme, comprise an array of pixels equal in number to those in a normal television picture. At the other extreme, the panel may comprise a single pixel, a television picture being assembled from an array of such pixels, each with its own illumination system. In between these extremes the panel may be proportional to provide a subset of pixels of the whole television picture, an array of such panels being assembled to provide all the pixels of the T.V. frame.

The light source 3 comprises a fluorescent tube having an extended area of phosphor energised by ultraviolet radiation from a mercury gas discharge in the well known manner. The phosphor is very nearly a lambertian emitter, that is to say the phosphor on the inside of the glass envelope 5 appears equally bright at all angles of view to the surface. The cylindrical envelope of the tube then appears as a bar of light of uniform brightness across its width. Each point on the phosphor surface therefore emits light omnidirectionally. A light guide 6 is placed between the source 3 and the panel 1. In this example the guide 6 may consist of a transparent plastics material, such as polymethylmethacrylate (PMMA), and has a transparent input face 7 either placed directly in contact with the tube 3 or coupled by a parallel sided guide 8 to the cylindrical surface 9 of the fluorescent tube. The guide 6 has a transparent output face 10 adjacent the panel and covering the area of panel 1. In this example the guide is shown having a square cross-section. Guide 6 is tapered, the input face 7 being smaller in area than the output face 10. In this example, the linear dimension of the output face is four times that of the input face so that the input face area is one sixteenth of the output face area. The walls 11 of the guide are polished smooth and are reflective to light inside the guide by virtue of the total internal reflection (T.I.R). The refractive index of PMMA is 1.495 so that the critical angle for T.I.R. is 42 degrees, light incident on the walls internally at angles to the normal greater than 42 degrees being totally reflected back into the guide. The parallel sided guide 8, used to feed light from the source to the input face is also polished smooth on all its faces and is in optical contact with the input face 7 so that there are no refraction or reflection effects at the interface. The input face 9 of guide 8 will typically be in touching but not optical contact with the cylindrical surface of the tube. The input face 9 is shown curved to fit the cylindrical envelope 5 in the FIG. 1 embodiment, but it could equally well be flat. In order to ensure a sealed interface between the guide and tube to exclude scattering or absorbing contaminants, the guide may optionally be optically bonded to the tube. In this case, a proportion of the light entering the guide escapes from the guide at first incidence because it is less than the critical angle. A light absorbing jacket, not shown, may optionally be provided around the tapered guide, but not in optical contact with it, to remove stray light.

The end 12 of the guide 6 is shown as flat and optically bonded to a plano-convex lens 13, which may possibly be of the same material as the guide, in which case the guide and lens may be made as one piece. The action of the lens 13 is to provide a general collimating effect on divergent light emerging from the guide, reducing the length of the guide.

The action of the tapered guide in reducing the divergence of light entering the small input face, passing down the guide, and leaving by the large output face is covered in detail, with the light direction exactly reversed, in the book by Welford and Winston cited in the preamble of this specification. Therein the action of non-imaging radiation concentrators is analysed in detail. In these concentrators fairly highly collimated radiation, usually direct sunshine, is taken in over a large area (analogous to our output face) and concentrated in a highly divergent form on a desirably much smaller area radiation collector (analogous our input face). The collector is either a heat collector in which it is desired to produce as high a temperature as possible or is a photovoltaic collector which is desirably of small area in view of the high relative cost of these devices. However the divergence reducing action of the tapered guide can be seen from the fact that a ray from the small input face passing down the guide at an angle to the guide axis will strike a reflective side wall which is itself inclined away from the guide axis because of the designed taper and will therefore be reflected back into the guide at a smaller angle to the guide axis than it had before reflection. In contrast, in a parallel sided guide no change of a ray angle magnitude to the guide axis occurs. One reflection may be sufficient to reduce the divergence to the desired extent.

With many types of liquid crystal displays it is desirable that the divergence of the light passing through the liquid crystal layer should be no greater than ±15 degrees, and preferably ±10 degrees, to obtain a full contrast range. This is a fact well known from the operation of the layer in attenuating light passing through it to a controlled extent.

Figures 2, 3, 4:
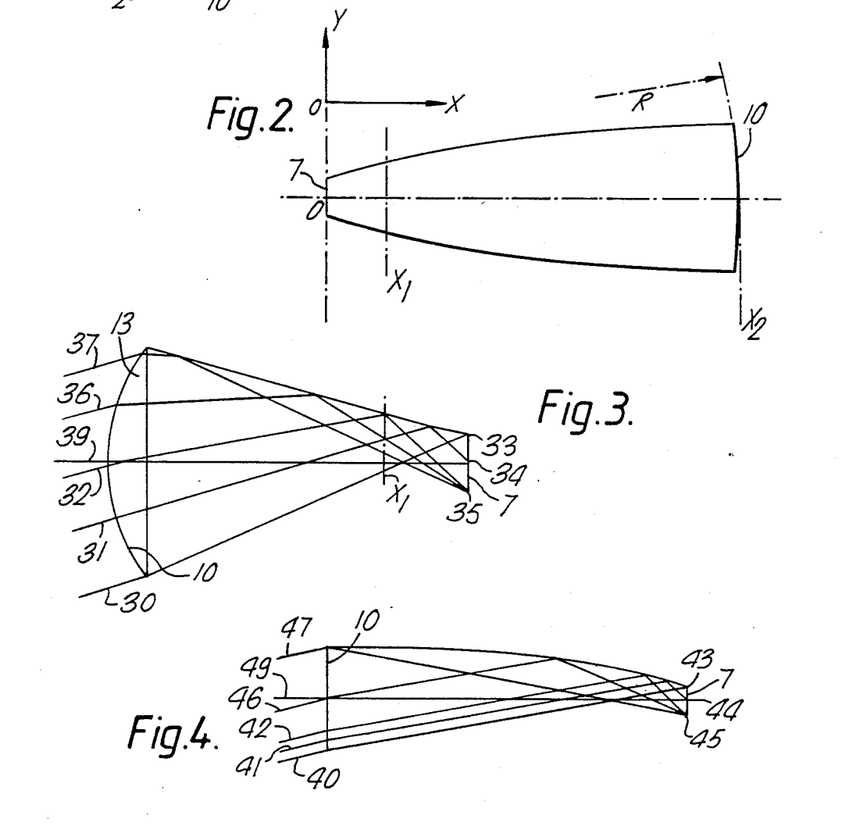
FIG. 2 shows a coordinate system used to describe the guide wall shape.
FIGS. 3 and 4 show ray paths in two examples of light guide.

The desired maximum divergence is determined by the ratio of the dimensions of the input and output faces. If the light guide is to have the ideal characteristic of sharp cut-off angles, the profile of the guide is determined in relation to the power of the positive lens on the output face. FIG. 2 shows an XY coordinate system which will be used to describe the profiles of some examples of guides. In these examples the profiles are in two parts, the first part extending from X=0 at the input face 7 to X=X$_1$, the second part extending from X=X$_1$ to X=X$_2$ at the output face 10 with a smooth transition between the two parts at X=X$_1$. The output face 10 can have a substantially spherical or cylindrical radius of curvature R. It could also be compounded of two cylindrical surfaces superposed with their cylinder axes at right angles. The guide is symmetrical about the X axis, each positive Y ordinate having an equal negative Y ordinate.

FIG. 3 shows ray paths in a tapered light guide having a positive lens 13 on the output face. The ratio of the linear dimension of the output face to the input face is four to one, as it is in FIG. 4 which shows a guide with a flat output face. In FIG. 3 rays 30, 31 and 32 originate from three points 33, 34 and 35 respectively on the input face having entered at the critical angle, that is, as the greatest angle to the axis 39 that is possible for them. These rays are reflected off the first part of the profile and all emerge at approximately 15 degrees to the axis after passing through lens 13. Rays from any part of the input face at smaller angles to the axis but directed at a wall are reflected at least once off some part of the wall to emerge at 15 degrees or less to the axis, rays 36 and 37 being examples of rays from point 35, ray 37 being incident on the wall with a larger angle of incidence than ray 36. After passing through lens 13 rays 36 and 37 emerge at approximately 15 degrees to the axis 39. Any ray from the input face not incident upon a wall is incident directly on the lens 13 and emerges at an angle of less than 15 degrees on one side or the other of the axis 39. For clarity only rays on one side of the axis are shown, rays on the other side being a mirror image of those shown.

In FIG. 4 the rays from corresponding points have the same units numeral as the rays in FIG. 3. It will be seen that the absence of the positive lens on the output face necessitates a considerably longer guide in relation to the input and output face dimensions.

There now follows five particular examples of numerically defined profiles. The first two examples show how the length of the light guide is dependent on the radius of the curved output face. They have identical input and output apertures, and are made of the same material. Dimensions are given in arbitrary units, since the guides would be scaled up or down in size to suit the particular application.

EXAMPLE 1

An angle reducing light guide with maximum output angle of ±15 degrees in which the input aperture is 2.5, the output aperture is 10.0, and length is 29.58.

The input face is flat, and the output face is curved with a radius of 40.0 convex to the outside. The light guide is made of a material which has a refractive index of 1.495, such as PMMA or an appropriate glass.

The profile of the curved side surfaces of the light guide is given by the equation:

$$y = A_0 + A_1 x + A_2 x^2 + A_3 x^3 + A_4 x^4 + A_5 x^5 + A_6 x^6$$

where x is the distance along the axis of the light guide measured from the flat input face, y is the height of the profile above this axis, and $A_0$ to $A_6$ are coefficient as given below.

The profile is in two sections with a smooth transition at the joint.

From x=0 to x=3.987, the coefficients are $$A_0 = 1.25 \quad A_1 = .26724$$

$$A_2 = .0014813 \quad A_3 = -6.1900 \times 10^{-5}$$

$$A_4 = 2.0518 \times 10^{-5} \quad A_5 = -3.1565 \times 10^{-6}$$

$$A_6 = 1.5685 \times 10^{-7}$$

From x=3.987 to x=29.268, the coefficients are $$A_0 = .84297 \quad A_1 = .50218$$

$$A_2 = -.040047 \quad A_3 = .0023612$$

$$A_4 = -8.7589 \times 10^{-5} \quad A_5 = 1.7890 \times 10^{-6}$$

$$A_6 = -1.5248 \times 10^{-8}$$

EXAMPLE 2

An angle reducing light guide similar to Example 1, with maximum output angle of ±15 degrees in which the input aperture is 2.5, and the output aperture is 10.0, but with a much reduced length of 16.65.

The input face is flat, and the output face is curved with a radius of 8.0 convex to the outside. The light guide is made of a material which has a refractive index of 1.495, such as PMMA or an appropriate glass.

The profile of the curved side surfaces of the light guide is given by the same equation as in Example 1, the coefficients being given below.

The profile is in two sections with a smooth transition at the joint.

From x=0 to x=3.765, the coefficients are $$A_0 = 1.25 \quad A_1 = .16957$$

$$A_2 = .0027063 \quad A_3 = -.0055697$$

$$A_4 = .0014544 \quad A_5 = -2.3040 \times 10^{-4}$$

$$A_6 = 1.5915 \times 10^{-5}$$

From x=3.765 to x=14.894, the coefficients are $$A_0 = .75325 \quad A_1 = .49699$$

$$A_2 = -.050965 \quad A_3 = .0055546$$

$$A_4 = -3.4068 \times 10^{-4} \quad A_5 = 1.1334 \times 10^{-5}$$

-continued $$A_6 = -1.5974 \times 10^{-7}$$

The next example shows how smaller output angles may be obtained and how other materials may be used. The dimensions given are smaller to indicate that a large number of very small light guides may be used with consequent reduction of the depth of the system. It is possible to have one light guide for each picture element, light feed arrangements being shown later.

EXAMPLE 3

An angle reducing light guide with maximum output angle of ±10 degrees in which the input aperture is 0.1667, the output aperture is 1.0, and length is 2.965.

The input face is flat, and the output face is curved with a radius of 2.0 convex to the outside. The light guide is made of a material which has a refractive index of 1.57, such as polycarbonate or an appropriate glass.

The profile of the curved side surfaces of the light guide is given by the equation as before, the coefficients being given below.

The profile is in two sections with a smooth transition at the joint.

From x=0 to x=0.2966, the coefficients are $$A_0 = 0.08333 \; A_1 = .25167$$

$$A_2 = .031721 \; A_3 = 0.17636$$

$$A_4 = -1.1428 \; A_5 = 3.4221$$

$$A_6 = -3.9087$$

From x=0.2966 to x=2.901, the coefficients are $$A_0 = .060727 \; A_1 = .43015$$

$$A_2 = -.36564 \; A_3 = .24897$$

$$A_4 = -.10125 \; A_5 = .022138$$

$$A_6 = -.0019918$$

The next example has similar output angles to Example 3, and also shows how an output lens of different material may be used. The dimensions given are larger to indicate that a small number of large light guides may be used with consequent increase in the depth of the system. It is possible to have one light guide for the whole picture.

EXAMPLE 4

An angle reducing light guide with maximum output angle of ±10 degrees, in which the input aperture is 33.3, the output aperture is 200, and length is 253.5.

The main part of the light guide has flat input and output faces, and is made of a material which has a refractive index of 1.495, such as PMMA or an appropriate glass. A plano-convex lens with a radius of 150 on the convex surface, and made of a glass or plastic material with refractive index 1.75, is cemented or moulded to the output face.

The profile of the curved side surfaces of the light guide is given by the equation as before, the coefficients being given below.

The profile is in two sections with a smooth transition at the joint.

From x=0 to x=54.92, the coefficient are $$A_0 = 16.6677 \; A_1 = .16279$$

$$A_2 = .0054678 \; A_3 = -1.6460 \times 10^{-4}$$

$$A_4 = 4.0225 \times 10^{-6} \; A_5 = -5.2560 \times 10^{-8}$$

$$A_6 = 2.7652 \times 10^{-10}$$

From x=54.92 to x=232.2, the coefficients are $$A_0 = 9.99533 \; A_1 = .49150$$

$$A_2 = -.0023410 \; A_3 = 2.2415 \times 10^{-5}$$

$$A_4 = -1.1317 \times 10^{-7} \; A_5 = 2.9714 \times 10^{-10}$$

$$A_6 = -3.1977 \times 10^{-13}$$

An examination of the profiles in Example 2 shows that they approximate to linear profiles over most of their length. It is therefore possible to design a light guide which is of much simpler construction, but with a performance slightly inferior to a light guide which has the ideal shape. The most noticeable effect will be that the cut-off of the output angle will not be so sharp.

EXAMPLE 5

An angle reducing light guide similar to Example 2, with nominal output angle of ±15 degrees, in which the input aperture is 2.5, and the output aperture is 10.0, and with a length of 16.65.

The input face is flat, and the output face is curved with a radius of 8.0 convex to the outside. The light guide is made of a material which has a refractive index of 1.495, such as PMMA or an appropriate glass.

The profile of the side surfaces of the light guide is given by the simplified equation:

$$y = A_0 + A_1 x$$

where x is the distance along the axis of the light guide measured from the flat input face, y is the height of the profile above this axis, and $A_0$ and $A_1$ are coefficients as given below.

The coefficients for the profile are $$A_0 = 1.25 \; A_1 = .25179.$$

All the light guides in the examples given have been solid transparent bodies, using total internal reflection to produce reflective side walls. To give a light weight structure, the guides can alternatively be hollow shapes with relatively thin walls coated on the inside with a reflective layer. The input and output faces then have no interface surface, except when a positive lens is attached over the output face.

In the event that a television picture is displayed, the output light divergence of ±15 degrees or less may not render the picture visible over a sufficient range of angles, particularly in the horizontal plane, to accommodate a number of viewing persons seated in a row in front of the picture. A diffusing screen may then be placed adjacent to the liquid crystal display panel on the side remote from the light guide. A simple diffuser such as a ground glass surface may spread the output light in the vertical plane, towards the ceiling and floor of the room where it is not required and with the consequence that the brightness of the picture seen by the viewers in the horizontal plane is reduced. A vertically oriented lenticular lens system may be preferable with a separate vertical cylindrical lens for each column of picture elements or for a number of columns of picture elements. The angle of light spread in the horizontal plane can then be controlled with little spread in the vertical plane.

However, in other applications the limited divergence of light output from the guides may not be a disadvantage and may even be turned to advantage. In applications where there is only one viewer, such as the head-up display in a single seat aircraft cockpit, the limited divergence would be no disadvantage. In bank terminals, cash-points, and the like, the limited divergence would assist in providing a display restricted to viewing by the user only.

Figure 5:
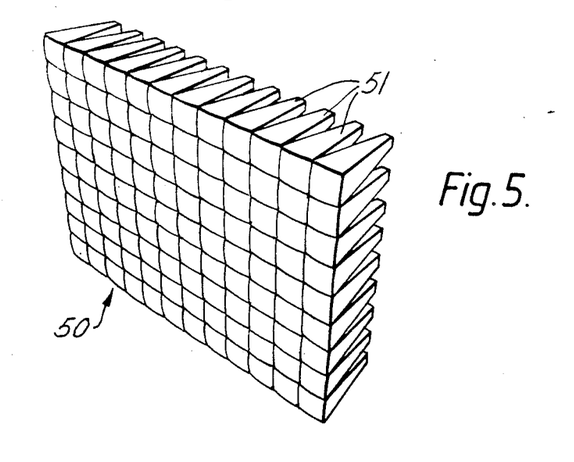
FIG. 5 shows a rectangular array of tapered light guides for use in illuminating an extended area liquid crystal display panel.

FIG. 5 shows a rectangular array 50 of 108 square output face tapered light guides 51 arranged in a 12×9 array to cover an extended area liquid crystal display panel having an aspect ratio of 4:3 as required for a television picture. Thus each guide illuminates one ninth of the height or about 67 lines of a nominal 625 line picture.

Figures 6, 7:
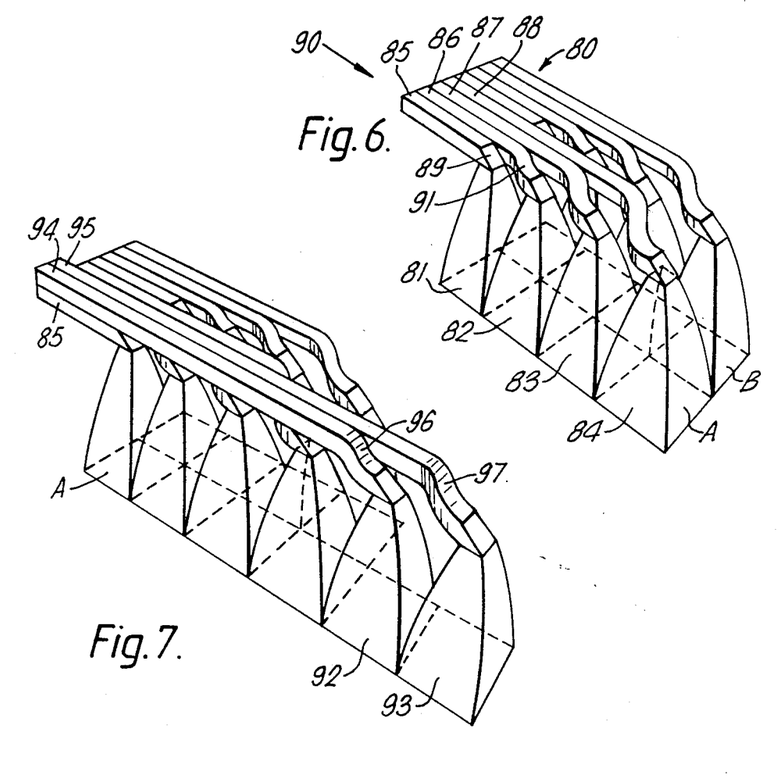
FIG. 6 shows an array of guides with feeder light guides.
FIG. 7 shows the FIG. 6 array with part of a second layer of feeder light guides.

FIG. 6 shows a small part of the array of FIG. 5 with a feeder light guide arrangement 80 for feeding each of a column A of tapered guides with light from a common source. A column of four adjacent guides 81, 82, 83 and 84 are shown fed by a closed-packed assembly of four parallel-sided square-section solid feed guides 85, 86, 87 and 88 respectively. Feed guide 85 is straight with a 45 degree face 89 opposite the input face of guide 81. Light 90 fed into guide 85 passes by T.I.R. down the guide and is reflected, also by T.I.R., by face 89 into the guide. Guide 86 is also initially straight and is close packed alongside guide 85 to which it may or may not be bonded in optical contact. Spreading of light 90 between the parallel parts of the feed guides may be of assistance in equalising the light inputs to the guides. A solid, mechanically robust light feeder guide assembly may be desirable. Guide 86 has a swan-neck portion 91 to bring its output end into line with the second guide 82 of the column. Feeder guides 87 and 88 are very similar, differing only in being progressively longer and having more accentuated swan-neck portions.

FIG. 6 shows a second column B of four tapered guides fed by a set of four feeder guides identical to guides 85, 86, 87 and 88. The input ends of the eight guides are arranged in a line to face a planar light source.

FIG. 7 shows the first two guides 92, 93 of a four guide column extension to column A of FIG. 6. The respective feeder guides 94 and 95 are stacked immediately above and parallel to guides 85 and 86 respectively. The swan-neck portion 96 is provided to lower the guide 94 onto the input face of tapered guide 92. The swan-neck portion 97 not only brings the output end of the feeder guide into line with column A but also lowers it to meet the input face of tapered guide 93. The feeder guides are preferably in optical contact with, and could be mechanically bonded to, their respective tapered guides. This avoids an optical interface where scattering and loss of light by contaminants might occur and also provides mechanical robustness.

Figure 8:
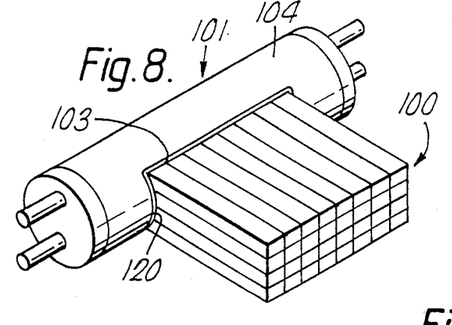
FIG. 8 shows an arrangement for coupling feeder light guides to a fluorescent tube.

FIG. 8 shows an arrangement for coupling a bundle 100 of close-packed feeder guides to a fluorescent tube 101. The end 102 of the bundle is formed into a polished cylindrical surface to fit the glass envelope 103 of the tube and is butted against it. Except in the area of the tube facing bundle end 102, the fluorescent tube has a reflective layer 104 to reflect light back into the tube. After scattering, some of this reflected light will emerge from the tube opposite bundle end 102 increasing the quantity of light entering the feeder guides.

Figure 9:
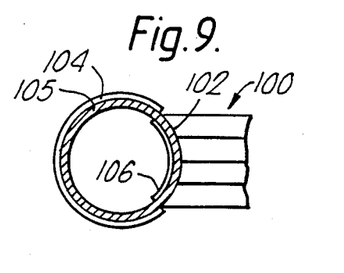
FIG. 9 shows a cross-section of an alternative form of fluorescent tube light source.

FIG. 9 shows a cross section of an alternative form of fluorescent tube light source. The envelope 105 of the tube is made of quartz, or other material transparent to the 365 nm line of the mercury gas discharge. The reflective layer 104 is present in the same position and extent as in the FIG. 8 tube. However, there is no phosphor on the inside of the tube opposite the reflective layer, only opposite the bundle end 102 at 106. Thus light is only produced immediately adjacent to the bundle end, the reflective layer 104 acting to concentrate ultra-violet radiation on the phosphor. Light absorption losses are therefore much reduced as compared to the FIG. 8 tube. The power consumption of the FIG. 9 tube can therefore be reduced for a given phosphor brightness.

Figures 10, 12:
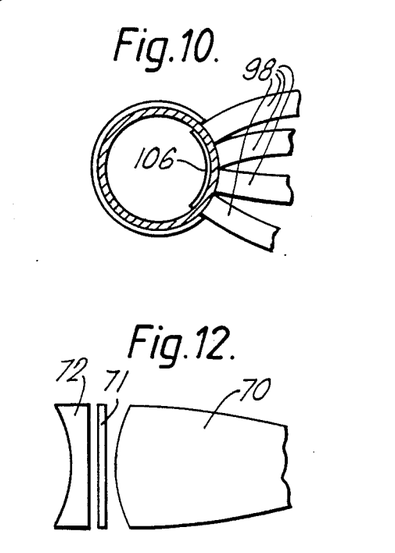
FIG. 10 shows an alternative arrangement for coupling feeder light guides to a fluorescent tube.
FIG. 12 shows a side view of a tapered guide for illuminating one or more picture elements and having a light diffusing lens structure and, FIG. 13 shows light guide illumination for a triplet of liquid crystal elements, each with a light diffusing lens structure.

FIG. 10 shows the feeder guides of FIG. 9 separated, 98, each being normal to the phosphor layer 106 so that the illumination conditions at the guide inputs are more nearly identical.

Figure 11:
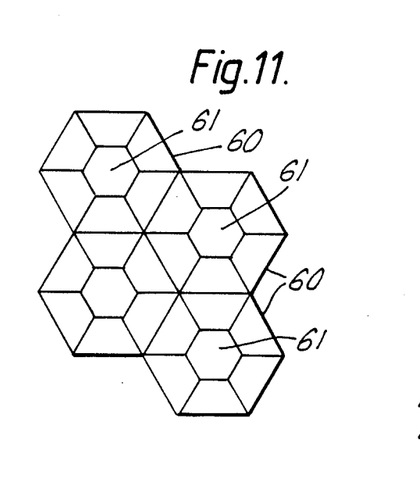
FIG. 11 shows a front view of part of an array of guides of hexagonal cross-section.

FIG. 11 shows a front view of part of a close-packed array of hexagonal cross-section light guides. The hexagonal output faces 60 are close-packed, the input faces 61 being separated but still arranged in columns. Thus a feeder guide arrangement as shown in FIGS. 6 and 7 can be used to feed the hexagonal guides, the only changes being that each feeder guide would be hexagonal in cross-section, and alternate columns would have different length feeder guides.

Desirably, it should be possible to display a colour television picture. In this event each pixel is a cluster of three sub-pixels, red, blue and green. If the picture is viewed at angles away from the normal to the panel, the relative brightnesses of the three sub-pixels in a pixel should not change as a function of viewing angle, otherwise the hue of the pixel will change as a function of angle. The absolute brightness of the pixel may well fall off with increasing angle of view. It is important, therefore, that the horizontal light diffusion polar diagram should be well controlled and equal for the three sub-pixels of any pixel. FIG. 12 shows a tapered guide 70 illuminating one or more pixels or sub-pixel panel area 71. A positive or negative power lens array 72 is provided beyond the panel 71, the figure showing the cross-section of a cylindrical lens accepting light from a vertical column of panels 71 normal to the plane of the drawing. The light diffusion polar diagram can be controlled via the choice of the lens power. Being a lens rather than a scattering element, there is much lower loss of light by scattering, the light being directed only where it is required.

Figure 13:
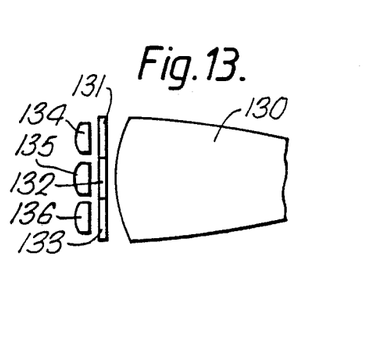

FIG. 13 shows a tapered guide 130 feeding a single pixel having three sub-pixels 131, 132, 133 with positive lenticular lenses 134, 135, 136 respectively, the sub-pixels being the red, blue and green parts of a colour pixel. Light passing through each sub-pixel is brought to a focus immediately in front of the lens and diverges thereafter.

Returning to the array of FIG. 5 and the feeder guide arrangement of FIGS. 6 and 7, it is desirable that a single source of light should illuminate the whole panel. Ageing of the light source will then not produce differences in brighnesses between pixels. But a column of tapered guides could be split into two halves and a separate feeder guide arrangement be provided for the two halves, each fed from its own light source. A more compact display panel with fewer assembly problems would result.

I claim:

1. An illumination system for a liquid crystal display panel comprising
    a liquid crystalline display panel,
    an extended area source of omnidirectional light,
    light conducting means for conducting said extended area of omnidirectional light from said source to said display panel, said light conducting means including
    an extended transparent input face adjacent said source of omnidirectional light,
    an extended transparent output face directly adjacent to said display panel, said output face being larger in area than said input face, and said output face being convex toward said display panel, and
    tapered reflective side walls extending from said input face to said output face, said side walls being at an angle to said input face and said output face,
    wherein said output face passes collimated light directly into said liquid crystal display panel at smaller angles of divergence than light entering said input face from said source.

2. An illumination system according to claim 1, wherein said light conducting means includes a transparent material having a refractive index higher than that of surrounding space, and wherein said side walls are totally internally reflecting.

3. An illumination system according to claim 1, wherein said output face includes a positive lens.

4. An illumination system according to claim 3, wherein said light conducting means includes a transparent material having a refractive index higher than that of surrounding space, and wherein said side walls are totally internally reflecting.

5. An illumination system according to claim 1 or claim 3 or claim 4, wherein said side walls are curved in planes transverse to said input face and said output face.

6. An illumination system according to claim 5, wherein a plurality of said light conducting means are disposed between said extended area source and said display panel, said output face of each of said plurality being adjacent to one another to cover the entire area of said display panel.

7. An illumination system according to claim 6, wherein said output face of each of said plurality are identical to one another, and wherein said output faces of said plurality are arranged in rows and columns to cover said entire area of said display panel.

8. An illumination system according to claim 7, wherein each of said plurality of output faces and each of the plurality of input faces of said light conducting means are rectangular.

9. An illumination system for a liquid crystal display panel comprising
    a liquid crystalline display panel,
    an extended area source of omnidirectional light,
    light conducting means for conducting said extended area of omnidirectional light from said source to said display panel, said light conducting means including
    an extended transparent input face adjacent said source of omnidirectional light,
    an extended transparent output face directly adjacent to said display panel, said output face being larger in area than said input face, and
    tapered reflective side walls extending from said input face to said output face, said side walls being at an angle to said input face and said output face,
    wherein said output face passes collimated light directly into said liquid crystal display panel at smaller angles of divergence than light entering said input face from said source,
    wherein said side walls are curved in planes transverse to said input face and said output face,
    wherein a plurality of said light conducting means are disposed between said extended area source and said display panel, said output face of each of said plurality being adjacent to one another to cover the entire area of said display panel, and
    wherein a plurality of feeder light guides are disposed between said source and said light conducting means, each of said plurality of feeder light guides extending between different areas of said extended area source and said input face of each of said plurality of light conducting means.

10. An illumination system according to claim 9, wherein said source of light includes a phosphor layer energized to produce light.

11. An illumination system according to claim 10, wherein said phosphor layer is energized by ultra-violet radiation from a gas discharge in a fluorescent tube.

12. An illumination system according to claim 11, wherein a part of said phosphor layer is disposed in said fluorescent tube free of said plurality of feeder light guides, and wherein light excited from said part is reflected back into said fluorescent tube onto other parts of said phosphor layer coupled to said feeder light guides.

13. An illumination system according to claim 12, wherein a light diffusing screen is disposed adjacent to a side of said liquid crystal display panel opposite to said light conducting means.

14. An illumination system according to claim 13, wherein said light diffusing screen includes a cylindrical lens array.

15. An illumination system according to claim 11, further comprising an envelope of a material transparent to said ultra-violet radiation, said envelope surrounding a portion of said fluorescent tube free of said feeder light guides, wherein said phosphor layer is disposed only at an inner area of said fluorescent tube facing said feeder light guides, and wherein other inner areas of said fluorescent tube are reflective to direct said ultra-violet radiation back onto said phosphor layer.

16. An illumination system according to claim 15 wherein a light diffusing screen is disposed adjacent to a side of said liquid crystal display panel opposite to said light conducting means.

17. An illumination system according to claim 16, wherein said light diffusing screen includes a cylindrical lens array.

18. An illumination system for a liquid crystal display panel comprising
    a liquid crystalline display panel,
    an extended area source of omnidirectional light,
    light conducting means for conducting said extended area of omnidirectional light from said source to said display panel, said light conducting means including
    an extended transparent input face adjacent said source of omnidirectional light, an extended transparent output face directly adjacent to said display panel, said output face being larger in area than said input face, and tapered reflective side walls extending from said input face to said output face, said side walls being at an angle to said input face and said output face, wherein said output face passes collimated light directly into said liquid crystal display panel at smaller angles of divergence than light entering said input face from said source, wherein said side walls are curved in planes transverse to said input face and said output face, wherein a plurality of said light conducting means are disposed between said extended area source and said display panel, said output face of each of said plurality being adjacent to one another to cover the entire area of said display panel, wherein said output face of each of said plurality are identical to one another, and wherein said output faces of said plurality are arranged in rows and columns to cover said entire area of said display panel, and wherein a plurality of feeder light guides are disposed between said source and said light conducting means, each of said plurality of feeder light guides extending between different areas of said extended area source and said input face of each of said plurality of light conducting means.

19. An illumination system according to claim 18, wherein said source of light includes a phosphor layer energized to produce light.

20. An illumination system according to claim 19, wherein said phosphor layer is energized by ultra-violet radiation from a gas discharge in a fluorescent tube.

21. An illumination system according to claim 20 wherein a part of said phosphor layer is disposed in said fluorescent tube free of said plurality of feeder light guides, and wherein light excited from said part is reflected back into said fluorescent tube onto other parts of said phosphor layer coupled to said feeder light guides.

22. An illumination system according to claim 21, wherein a light diffusing screen is disposed adjacent to a side of said liquid crystal display panel opposite to said light conducting means.

23. An illumination system according to claim 22, wherein said light diffusing screen includes a cylindrical lens array.

24. An illumination system according to claim 20, further comprising an envelope of a material transparent to said ultra-violet radiation, said envelope surrounding a portion of said fluorescent tube free of said feeder light guides, wherein said phosphor layer is disposed only at an inner area of said fluorescent tube facing said feeder light guides, and wherein other inner areas of said fluorescent tube are reflective to direct said ultra-violet radiation back onto said phosphor layer.

25. An illumination system according to claim 24 wherein a light diffusing screen is disposed adjacent to a side of said liquid crystal display panel opposite to said light conducting means.

26. An illumination system according to claim 25, wherein said light diffusing screen includes a cylindrical lens array.

27. An illumination system for a liquid crystal display panel comprising a liquid crystalline display panel, an extended area source of omnidirectional light, light conducting means for conducting said extended area of omnidirectional light from said source to said display panel, said light conducting means including an extended transparent input face adjacent said source of omnidirectional light, an extended transparent output face directly adjacent to said display panel, said output face being larger in area than said input face, and tapered reflective side walls extending from said input face to said output face, said side walls being at an angle to said input face and said output face, wherein said output face passes collimated light directly into said liquid crystal display panel at smaller angles of divergence than light entering said input face from said source, wherein said side walls are curved in planes transverse to said input face and said output face, wherein a plurality of said light conducting means are disposed between said extended area source and said display panel, said output face of each of said plurality being adjacent to one another to cover the entire area of said display panel, wherein said output face of each of said plurality are identical to one another, and wherein said output faces of said plurality are arranged in rows and columns to cover said entire area of said display panel, wherein each of said plurality of output faces and each of the plurality of input faces of said light conducting means are rectangular, and wherein a plurality of feeder light guides are disposed between said source and said light conducting means, each of said plurality of feeder light guides extending between different areas of said extended area source and said input face of each of said plurality of light conducting means.

28. An illumination system according to claim 27, wherein said source of light includes a phosphor layer energized to produce light.

29. An illumination system according to claim 28, wherein said phosphor layer is energized by ultra-violet radiation from a gas discharge in a fluorescent tube.

30. An illumination system according to claim 29 wherein a part of said phosphor layer is disposed in said fluorescent tube free of said plurality of feeder light guides, and wherein light excited from said part is reflected back into said fluorescent tube onto other parts of said phosphor layer coupled to said feeder light guides.

31. An illumination system according to claim 30, wherein a light diffusing screen is disposed adjacent to a side of said liquid crystal display panel opposite to said light conducting means.

32. An illumination system according to claim 31, wherein said light diffusing screen includes a cylindrical lens array.

33. An illumination system according to claim 29, further comprising an envelope of a material transparent to said ultra-violet radiation, said envelope surrounding a portion of said fluorescent tube free of said feeder light guides, wherein said phosphor layer is disposed only at an inner area of said fluorescent tube facing said feeder light guides, and wherein other inner areas of said fluorescent tube are reflective to direct said ultra-violet radiation back onto said phosphor layer.

34. An illumination system according to claim 33 wherein a light diffusing screen is disposed adjacent to a side of said liquid crystal display panel opposite to said light conducting means.

35. An illumination system according to claim 34, wherein said light diffusing screen includes a cylindrical lens array.

* * * * *